Jan. 6, 1970 A. J. DE MEO 3,487,474
BELT WITH HAND-GRIPS
Filed July 31, 1968 2 Sheets-Sheet 1
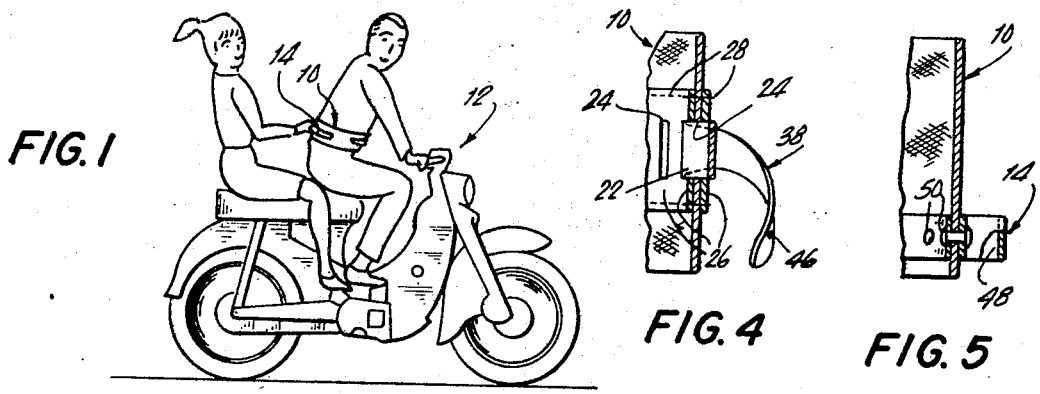
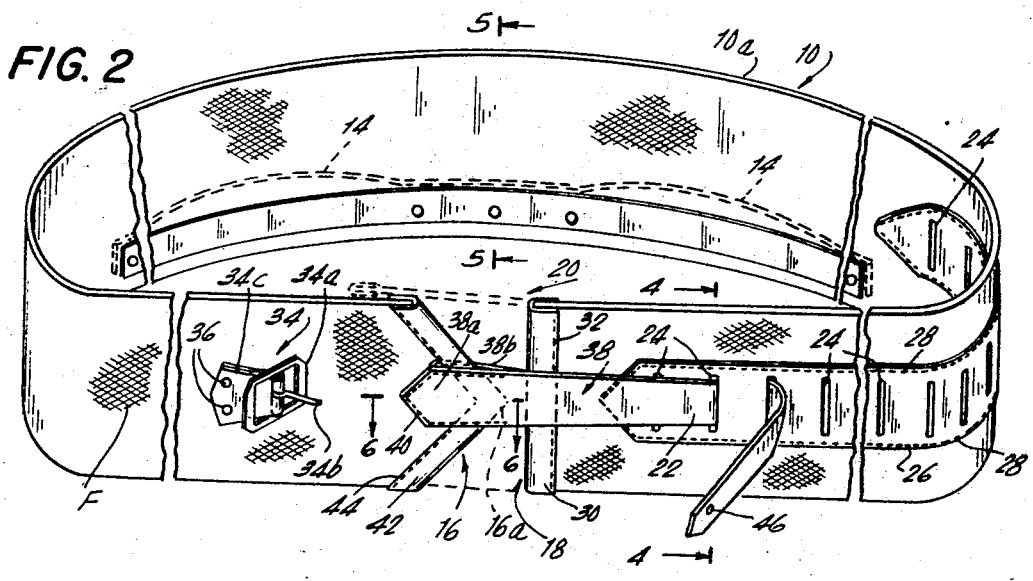
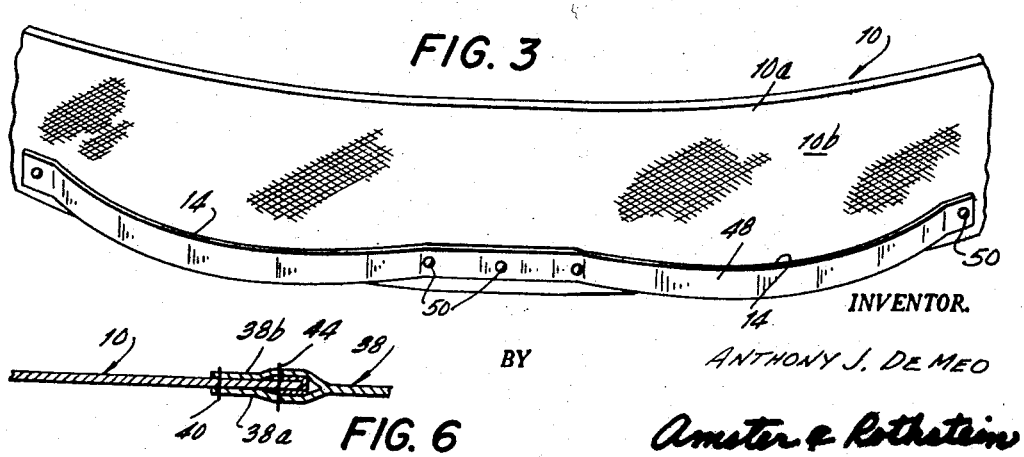
INVENTOR.
ANTHONY J. DE MEO
BY
Amster & Rothstein
ATTORNEYS Jan. 6, 1970  A. J. DE MEO  3,487,474
BELT WITH HAND-GRIPS Filed July 31, 1968

INVENTOR.
ANTHONY J. DE MEO

BY

Ansttr & Bthstlin
ATTORNEYS

United States Patent Office 3,487,474
Patented Jan. 6, 1970

3,487,474
BELT WITH HAND-GRIPS
Anthony J. De Meo, 2072 E. 17th St.,
Brooklyn, N.Y. 11229
Filed July 31, 1968, Ser. No. 756,706
Int. Cl. A41f 9/00; A62b 1/16
U.S. Cl. 2—311     1 Claim

ABSTRACT OF THE DISCLOSURE

A belt adapted to encircle the waist of the driver of a motorcycle. A pair of hand-grips is fixed to the rear half of the belt, which can be grasped by the hands of a passenger riding behind the driver.

---

The present invention relates generally to belts, and more particularly to certain improvements facilitating the use of such products as safety belts either worn on the person or employed with vehicles or the like.

To function effectively as a safety belt, the belt cooperating attaching means, as is usually provided on the respective ends of the belt, must provide a firm connection between the belt ends which is not readily inadvertently disconnected. Additionally, a commercially acceptable belt cooperating attaching means must have adequate provision for achieving a selective connection of the belt ends so that the belt can be accommodated to a variety of waist sizes of users. These requirements are usually satisfied by complicated buckles, gripping mechanisms or the like, appropriately secured to one belt end and engaging with the other belt end. In these conventional belt attaching means, practically all of the strain of the connection is borne by the belt end having the buckle or gripping mechanism. Further, the buckle or gripping mechanism, which is usually metallic, is also usually so heavy and bulky as to be uncomfortable when embodied in a safety belt intended to be worn on the person.

Generally, it is an object of the present invention to provide a belt cooperating attaching means overcoming the foregoing and other shortcomings of the prior art. Specifically, it is an object to provide a cooperating attaching means for a safety belt wherein the strain of the connection of the belt ends is borne by structure on both belt ends. Among other advantages, this division of the strain of the connection minimizes the need for using materials of construction noted for strength, such as metals or the like, and instead enables the use of lighter web materials, such as fabric, leather, plastic or the like, without any sacrifice in the strength of the connection.

A still further object of the present invention is to use to maximum advantage the foregoing improved belt cooperating attaching means by embodying the same in a comfortable, safety belt intended particularly for wear on the person during the operation of a motor scooter or the like.

A safety belt, whether of a unitary structure such as when worn on the person or whether formed in two segments such as when used in a vehicle or the like, which demonstrates features and objects of the present invention includes a cooperating attaching means respectively located on the belt ends to be connected to each other and each of which effectively functions to maintain or contribute to the firm connection of the belt ends. One of the cooperating attaching means, provided on one belt end, includes a plurality of spaced loops, which in a preferred embodiment are formed out of the material of construction of the belt end, such loops being delineated from each other by spaced transverse slots through the material. The other cooperating attaching means, provided on the other belt end, includes a fastening member such as a buckle spaced inwardly along this belt end and a fastening strap extending beyond the edge of this belt end. To connect the belt ends, the fastening strap is selectively looped through any one of the loops, depending upon the belt size desired, and then engaged by the buckle, such connection thus having a loop on one belt end and the buckle on the other belt end to bear the strain of the connection.

In accordance with certain product aspects of the present invention, there is further provided a safety belt intended to be worn by the driver of a motor scooter or the like and having strategically located hand-grips thereon advantageously presented to a passenger seated behind the driver to help this passenger maintain balance and position on the scooter.

The above brief description, as well as further objects, features and advantages of the present invention, will be more fully appreciated by reference to the following detailed description of a presently preferred, but nonetheless illustrative embodiment in accordance with the present invention, when taken in conjunction with the accompanying drawings, wherein:

FIG. 1 is a view illustrating use of the belt hereof as a safety belt during the operation of a motor scooter;

FIG. 2 is a perspective view of the belt illustrating the cooperating attaching means for selectively connecting the opposite belt ends together;

FIG. 3 is a partial perspective view of the rear outer face of the belt illustrating the hand-grips provided on this portion of the belt according to the present invention;

FIG. 4 is an elevational view, in section taken on line 4—4 of FIG. 2, illustrating the manner in which connection is made between the belt ends;

FIG. 5 is an elevational view, in section taken on line 5—5 of FIG. 2, illustrating the preferred manner of attaching the hand-grips to the rear portion of the belt;

FIG. 6 is a plan view, in section taken on line 6—6 of FIG. 2, illustrating further details of construction of the cooperating attaching means for the belt;

Figure 7:
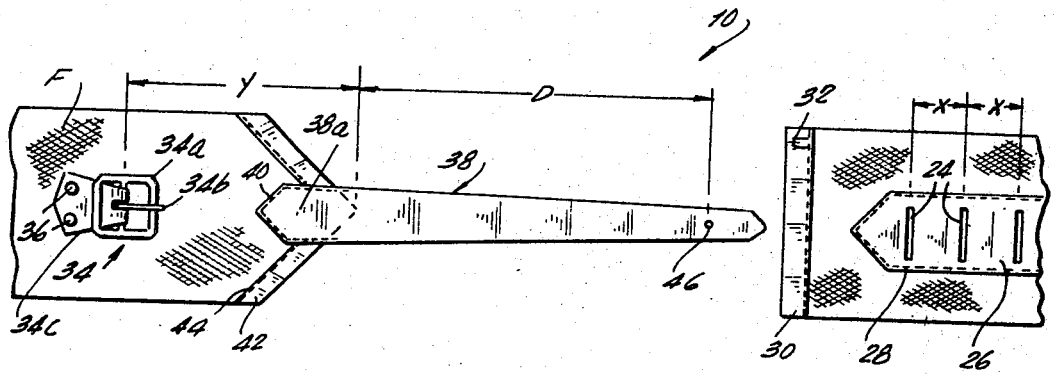
FIG. 7 is a partial elevational view of the ends of the belt and of the cooperating attaching means on such ends for making a selective connection therebetween.

Reference is now made to the drawings, and particularly to FIG. 1, wherein there is shown a belt, generally designated 10, demonstrating features of the present invention and illustrated in an embodiment particularly suitable for use as a safety belt during operation of a motor scooter 12. This use as a motor scooter safety belt emphasizes the noteworthy features of the belt 10 in that it will be readily appreciated that such use requires a method and technique of attaching the ends of the belt together in such a way that inadvertent detachment thereof is not possible. Only under these circumstances can the safe use of hand-grips 14 firmly secured to the rear of the belt 10 be assured in accordance with one aspect of the present invention. With the belt 10 firmly secured about the waist of the driver of the motor scooter 12, the hand-grips 14, in an obvious manner, are advantageously presented for gripping by a second passenger seated on the motor scooter 12 behind the driver. In addition to the use of the belt 10 hereof as a safety device during operation of a motor scooter 12 as just described, it is also contemplated that the cooperating attaching means for the ends of the belt making possible this use can also be applied to belt segments and the like such as is commonly found in safety belt embodiments for vehicles and the like. That is, instead of the belt 10 being a unitary structure, it could also be embodied as two separate segments anchored at one end, in any appropriate manner, to the frame of a vehicle seat and having the cooperating attaching means hereof located at the opposite free ends of such belt segments. As used in the claims, the term "belt" is thus intended to cover a unitary structure as exemplified by the belt 10 or a structure having discrete segments such as would be the case when utilized as a safety belt in a vehicle or the like.

In both of the foregoing and other uses, the belt 10 presents a pair of opposite ends 16 and 18 which are connected to each other during the wearing of the belt. Further, as is generally understood in the construction of belts, a commercially acceptabe attaching means for the belt ends 16, 18 must have provision for selectively connecting the ends to each other so that the belt 10 will accommodate to a variety of sizes of individuals. To this end, the belt 10 has a cooperating pair of attaching means, generally designated 20, located respectively at each of the belt ends 16 and 18 and effective to provide a firm and strong connection between the belt ends 16 and 18, and also a connection which has a range of adjustments so that the belt 10 can be made to accommodate to a variety of waist sizes of users of the belt.

The one of the cooperating attaching means 20 which, more particularly, is provided on the belt end 18 includes a grouping of loops 22, starting adjacent the belt end 18 and extending inwardly therefrom, one next to the other, for a section of belt length which in some belt embodiments may be equal to a third of the overall length of the belt. In the preferred embodiment illustrated herein, each loop 22 is delineated from the next adjacent loop by transverse slots 24 through the woven fabric F of which the belt 10, and more particularly the elongated body 10a thereof, is constructed. A leather or vinyl facing strip 26 having spaced slits therein aligning with the slots 24 is advantageously stitched, as by the marginal stitching 28, to the belt body 10a for both improving the appearance of the belt and reinforcing the slots 24 against tearing. The edge of the belt end 18 is similarly also advantageously finished with a leather or vinyl strip 30 stitched, as at 32, over the belt end edge.

The other cooperating attaching means is located on the other belt end 16 and includes two structural elements. One element is a conventionally constructed buckle 34 having a usual frame 34a, a prong 34b and an attaching piece 34c firmly secured by rivets or the like, as at 36, to the belt body 10a for attaching the buckle 34 to this body. The buckle 34, as best illustrated in FIG. 7, is located at a predetermined distance Y inwardly along the belt end 16. Immediately adjacent the belt end 16 is the second element of the cooperating attaching means of this belt end which is an elongated fastening strap 38 which is slightly tapered to a narrower width from its base attached to the belt end 16 to the free end thereof, the degree of taper being such that the entire length of the fastening strap 38 which extends beyond the belt end 16 is narrow enough to be easily threaded through each of the slots 24. As best shown in FIG. 6, the fastening strap 38 at the base end thereof is sliced into two sections 38a, 38b for purposes of sandwiching the pointed portion 16a of the belt end 16 therebetween and firmly anchoring the fastening strap 38 to the belt end 16 by the marginal stitching 40. The belt end 16 is also advantageously finished at the edge thereof by a leather or vinyl strip 42 placed over and secured to this edge by the line of stitching 44.

Figure 8:
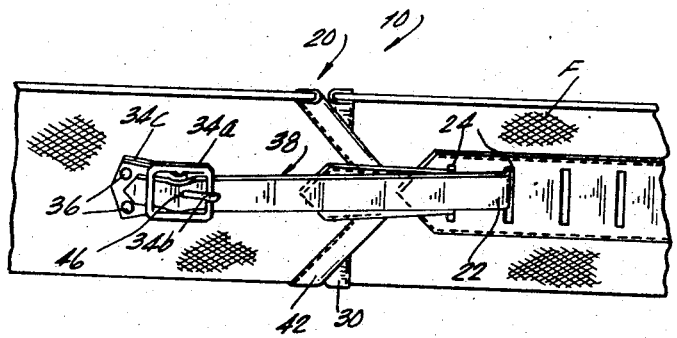
FIG. 8 is a view similar to FIG. 7 but showing the ends of the belt securely attached to each other.

As is best shown in FIGS. 2, 4, and as best understood by progressive examination of FIGS. 7 and 8, the cooperating attaching means 20 hereof is effective to provide both a firm and a selective connection for the belt ends 16 and 18. Essentially, the connection of the belt ends 16 and 18 to each other involves threading the fastening strap 38 in one direction under an appropriate loop 22 (depending upon the waist size of the wearer) and then folding the fastening strap 38 back in the opposite direction over the particular loop chosen for connection of the fastening strap 38 to the buckle 34. In connecting the fastening strap 38 to the buckle 34, the buckle prong 34b is projected through an appropriate opening 46 provided adjacent the free end of the strap 38, as is shown in FIG. 7. If desired, however, additional strap openings may be provided along the length of the strap as is shown in FIG. 2, although only one such opening is required to complete the attachment of the belt ends 16 and 18 to each other using the cooperating attaching means 20 of the present invention.

From the foregoing explanation, it should be appreciated that there is a predetermined size relationship between the various parts forming the cooperating attaching means 20. More particularly, the loops 22 are of a uniform width X, the buckle 48 as already indicated is located a predetermined distance or dimension Y inwardly of the belt end 16, and these two dimensions X, Y then dictate a minimum length D for the fastening strap 38 as measured along the longitudinal axis thereof from the edge of the belt end 16 to the strap opening 46. Since, for all practical purposes, the opening 46 is close to the free end of the fastening strap 38, the length D may be taken as the overall length of the strap itself, and is so intended as used in the claims. This length or dimension D should be at least as large as the distance Y plus twice the width X of a loop 22. This will assure that the fastening strap 38 can be threaded under and then back over a loop 22 and still be long enough to span the distance Y for connection to the buckle 34. This, of course, holds true whether the first encountered, second or any inwardly located loop 22 is chosen by the wearer of the belt 10, since the physical conditions of looping the fastening strap 38 and of making the connection thereof to the buckle 34 are constant regardless of which loop 22 is chosen. However, the particular loop 22 and the inwardly spaced location thereof will determine how much of the belt end 18 will overlap the other belt end 16. This overlapped condition of the ends 16 and 18 occurs to a more pronounced degree when looping each successively encountered loop. This can be best appreciated by comparing the relative locations of the belt ends 16, 18 which results from looping the second encountered loop 22, as illustrated in phantom perspective in FIG. 2, with the relative locations of these belt ends when looping the first encountered loop 22, as illustrated in FIG. 8.

Completing the construction of the belt 10, when such belt is used as a safety device during the operation of a motor scooter, is an elongated strap 48 firmly secured by rivets or the like, as at the plural locations 50, to the outer face 10b of the belt body 10a along a medial location of the belt body 10a. The spacing of the rivets 50 relative to the length of the strap 48 is such as to cause loops at opposite ends thereof which, in an obvious manner, function as a pair of hand-grips 14 for the belt 10. The belt 10 thus is a noteworthy product wherein it has the cooperating attaching means 20 for firmly securing the belt ends 16 and 18 to each other such that inadvertent detachment thereof is obviated, and wherein there is further included the hand-grips 14 on the rear of the belt 10 which are available to the rear passenger of the scooter 12 to help this passenger maintain balance and position on the scooter.

What is claimed is:

1. A belt adapted to be worn about the waist of a driver of a vehicle, the vehicle being of the type carrying a passenger to the rear of the driver without an intervening seat back, the belt comprising an elongated belt band terminating in ends, the band including a rear length circumscribing the rearward portion of the driver's waist, coupling means releasably interconnecting the ends of the belt, and a pair of elongated flexible hand-grips fixed to the rear length of the belt and spaced equidistantly from the center thereof, each hand-grip having a central portion projecting rearwardly from the belt and having a length such that it can be grasped by a hand of the passenger, the ends of each hand-grip being fixed to the rear length, and the hand-grips being formed of a single strip.

References Cited

UNITED STATES PATENTS

| | | | |
|---|---|---|---|
| 467,967 | 2/1892 | Allen | 24—17 |
| 1,600,027 | 9/1926 | Welsand | 182—3 X |
| 1,903,081 | 3/1933 | Wotherspoon | 119—96 X |
| 2,076,925 | 4/1937 | Steinberg | 2—237 |

MERVIN STEIN, Primary Examiner

G. VILARKIN, Assistant Examiner

U.S. Cl. X.R.

182—3; 297—385